United States Patent
Takemae

(10) Patent No.: US 9,536,155 B2
(45) Date of Patent: Jan. 3, 2017

(54) MARKING LINE DETECTION SYSTEM AND MARKING LINE DETECTION METHOD OF A DISTANT ROAD SURFACE AREA

(71) Applicant: TOYOTA JIDOSHA KABUSHIKI KAISHA, Toyota-shi, Aichi-ken (JP)

(72) Inventor: Yoshinao Takemae, Yokohama (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/613,973

(22) Filed: Feb. 4, 2015

(65) Prior Publication Data

US 2015/0227800 A1  Aug. 13, 2015

(30) Foreign Application Priority Data

Feb. 7, 2014  (JP) ................. 2014-022838

(51) Int. Cl.
| | | |
|---|---|---|
| G06K 9/00 | (2006.01) | |
| B60R 1/00 | (2006.01) | |
| E01F 11/00 | (2006.01) | |
| G08G 1/16 | (2006.01) | |
| G06T 7/00 | (2006.01) | |

(52) U.S. Cl.
CPC ............. *G06K 9/00798* (2013.01); *B60R 1/00* (2013.01); *E01F 11/00* (2013.01); *G06T 7/0081* (2013.01); *G06T 7/0083* (2013.01); *G08G 1/167* (2013.01); *G06T 2207/10028* (2013.01); *G06T 2207/30256* (2013.01)

(58) Field of Classification Search
None
See application file for complete search history.

(56) References Cited

U.S. PATENT DOCUMENTS

| 5,874,904 A * | 2/1999 | Hirabayashi | .......... G06T 7/0075 340/435 |
|---|---|---|---|
| 8,204,277 B2 * | 6/2012 | Zhang | ................ G06K 9/00798 382/104 |
| 2009/0041337 A1 * | 2/2009 | Nakano | .............. G06K 9/00798 382/154 |

(Continued)

FOREIGN PATENT DOCUMENTS

| JP | 2001-101428 A | 4/2001 |
|---|---|---|
| JP | 2003-118521 A | 4/2003 |

(Continued)

*Primary Examiner* — Tahmina Ansari
(74) *Attorney, Agent, or Firm* — Sughrue Mion, PLLC

(57) ABSTRACT

A marking line detection system includes an imaging device and an ECU. An information extraction unit of the ECU is configured to extract depth distance information from the imaging device to an imaging object based on image information in an imaging area captured by the imaging device. A road surface area identification unit of the ECU is configured to identify a distant road surface area based on the depth distance information, the distant road surface area being a road surface area that excludes an immediately-preceding road surface area of the vehicle in the image information and is more distant from the vehicle than the immediately-preceding road surface area. A marking line detection unit of the ECU is configured to detect a marking line in the distant road surface area based on image information corresponding to a position of the distant road surface area.

5 Claims, 10 Drawing Sheets

(56) References Cited

U.S. PATENT DOCUMENTS

| | | | | |
|---|---|---|---|---|
| 2010/0014714 A1* | 1/2010 | Zhang | ............... | G06K 9/00798 |
| | | | | 382/104 |
| 2011/0205362 A1* | 8/2011 | Suzuki | ............... | G06K 9/00798 |
| | | | | 348/148 |
| 2012/0288154 A1* | 11/2012 | Shima | ................... | G08G 1/167 |
| | | | | 382/103 |
| 2015/0165972 A1 | 6/2015 | Takemae et al. | | |
| 2015/0227800 A1* | 8/2015 | Takemae | ............... | G06T 7/0081 |
| | | | | 382/104 |

FOREIGN PATENT DOCUMENTS

| | | |
|---|---|---|
| JP | 2007-286724 A | 11/2007 |
| JP | 2010-060371 A | 3/2010 |
| JP | 2011-170750 A | 9/2011 |
| JP | 2012-014398 A | 1/2012 |
| WO | 2013190719 A1 | 12/2013 |

* cited by examiner

FIG. 2
BASE IMAGE INFORMATION
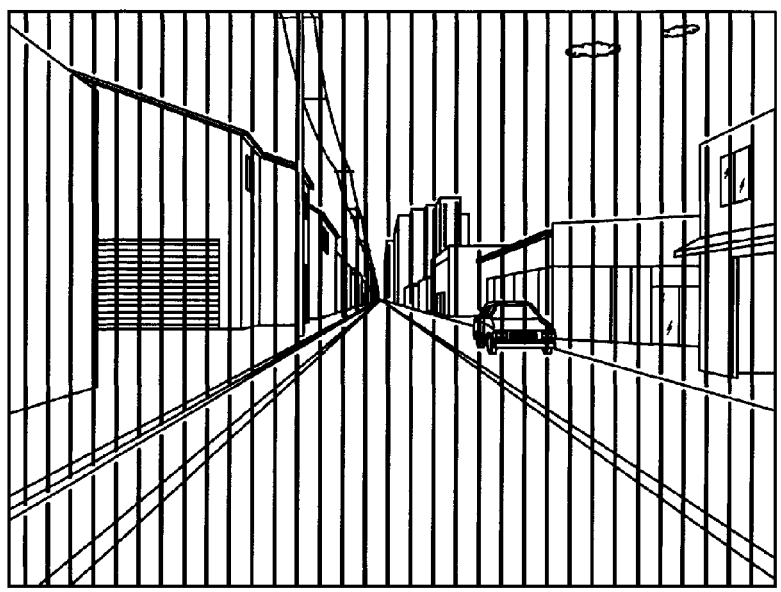
BASE IMAGE INFORMATION
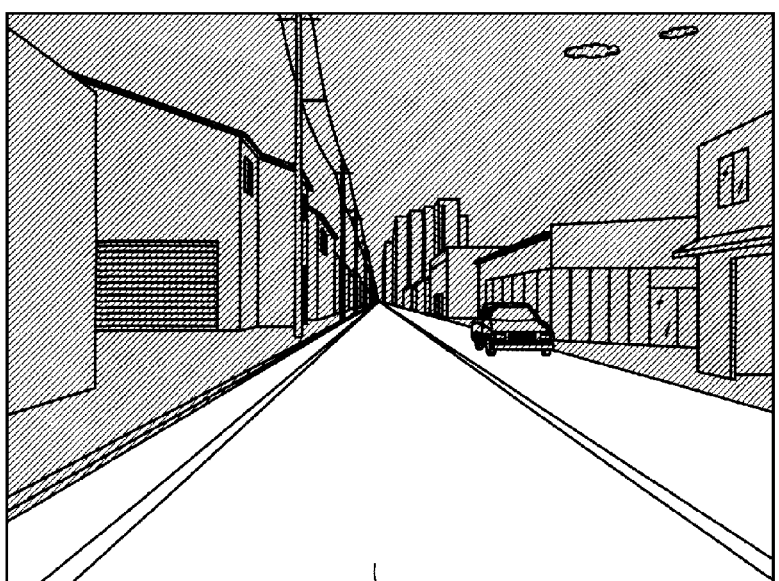
ROAD SURFACE ESTIMATION AREA

MARKING LINE DETECTION SYSTEM AND MARKING LINE DETECTION METHOD OF A DISTANT ROAD SURFACE AREA

INCORPORATION BY REFERENCE

The disclosure of Japanese Patent Application No. 2014-022838 filed on Feb. 7, 2014 including the specification, drawings and abstract is incorporated herein by reference in its entirety.

BACKGROUND OF THE INVENTION

1. Field of the Invention

The present invention relates to a marking line detection system and a marking line detection method.

2. Description of the Related Art

Japanese Patent Application Publication No. 2003-118521 (JP 2003-118521 A) is known as a detection system and a detection method for detecting a marking line on the road surface around a vehicle. Japanese Patent Application Publication No. 2003-118521 (JP 2003-118521 A) discloses a technology that initially sets the white line detection area in a captured image of the road in front of the vehicle as large as possible and, if the road parameters are updated later to reflect the actual road surface shape, sets the white line detection area as small as possible for increasing the processing speed while reducing the number of incorrect detections of non-white-line objects. This technology detects a distant white line by gradually shifting the white line detection area to fit the road surface shape while estimating the road parameters from the near side to the distant side of the vehicle. Japanese Patent Application Publication No. 2012-014398 (JP 2012-014398 A) discloses a technology that identifies a double white line, composed of a solid line and a broken line, on a line basis. This technology varies the identification method according to whether the area is near to the vehicle, where a double white line can be approximated almost as a straight line, or the area is distant from the vehicle where a double white line cannot be approximated almost as a double white line because the road, is a turning road. In this technology, because the solid line and the broken line of a double white line in a distant area are sometimes merged, the double white line, though provided for the vehicle, may be determined as a noise. Japanese Patent Application Publication No. 2010-060371 (JP 2010-060371 A) discloses a technology that calculates a histogram of edge intensities in the radiation direction from the vanishing point (determined in advance by the focus of the lens and the imaging surface) in the captured image to the vehicle side and, by identifying the direction in which the edge intensity becomes equal to or larger than the threshold, determines that there is a white line in that direction. Japanese Patent Application Publication No. 2011-170750 (JP 2011-170750 A) discloses a technology that records white line edges in a captured image for each frame but does not record white line edges for a frame when a pitch variation is generated in the vehicle. Japanese Patent Application Publication No. 2007-286724 (JP 2007-286724 A) discloses a technology that, when the vehicle enters an intersection, detects other vehicles that approach the intersection from the intersecting roads, based on the analysis result of the measuring points of each of the near area and the distant area that are set in the captured image of the road in front of the vehicle. In this technology, the density of the measuring points in the distant area is set higher than the density of the measuring points in the near area. Japanese Patent Application Publication No. 2001-101428 (JP 2001-101428 A) discloses a technology that changes the filter for extracting the edges of the preceding vehicle in the captured image of the road in front of the vehicle according to the distance between the vehicle and the preceding vehicle.

Incidentally, the technology for sequentially estimating the road surface shape while sequentially detecting the marking lines from the near side to the distant side has the following problems. For example, the road surface shape cannot sometimes be estimated correctly when the brightness value of the marking line is reduced by the shadow of a solid object such as a building, when the marking line is hidden by other vehicles or bicycles, or when the marking line is not detected continuously because the marking line is wavy. In such a case, the marking line cannot sometimes be detected during the estimation process because of insufficient information or because of the analysis of an incorrect area in the captured image. Therefore, there is room for increasing the detection accuracy of a distant marking line.

SUMMARY OF THE INVENTION

The present invention provides a marking line detection system and a marking line detection method that can overcome the inconvenience of the related art and increase the detection accuracy of a distant marking line.

A marking line detection system according to a first aspect of the present invention includes an imaging device and an electronic control unit. The imaging device is configured to capture surroundings of a vehicle. The electronic control unit includes an information extraction unit, a road surface area identification unit and a marking line detection unit. The information extraction unit is configured to extract depth distance information from the imaging device to an imaging object based on image information in an imaging area captured by the imaging device. The road surface area identification unit is configured to identify a distant road surface area based on the depth distance information, the distant road surface area being a road surface area that excludes an immediately-preceding road surface area of the vehicle in the image information and is more distant from the vehicle than the immediately-preceding road surface area. The marking line detection unit is configured to detect a marking line in the distant road surface area based on image information corresponding to a position of the distant road surface area.

A marking line detection method according to a second aspect of the present invention includes: extracting depth distance information from an imaging device to an imaging object based on image information in an imaging area captured by the imaging device that captures surroundings of a vehicle; identifying a distant road surface area based on the depth distance information, the distant road surface area being a road surface area that excludes an immediately-preceding road surface area of the vehicle in the image information and is more distant from the vehicle than the immediately-preceding road surface area; and detecting a marking line in the distant road surface area based on image information corresponding to a position of the distant road surface area.

According to the marking line detection system and the marking line detection method in the first aspect and the second aspect of the present invention, the vehicle's marking line in the distant road surface area can be detected without having to sequentially detect the marking line and, without having to estimate the road surface shape of the traveling road, from the immediately-preceding road surface area of the vehicle to the distant road surface area as in the system in the related art. Therefore, according to the marking line detection system and the marking line detection method in the first aspect and the second aspect of the present invention, a situation can be avoided in which the vehicle's marking line in a position distant from the vehicle cannot be detected, for example, when the road surface shape cannot be estimated successfully during traveling. This allows the marking line detection system and the marking line detection method in the first aspect and the second aspect of the present invention to increase the detection accuracy of a distant marking line. In the related art, when the road surface shape cannot be estimated successfully, there is a possibility that the marking line detection processing is performed for an incorrect area. In contrast, according to the marking line detection system and the marking line detection method in the first aspect and the second aspect of the present invention, the arithmetic processing performed due to such an incorrect recognition is reduced. Therefore, the detection accuracy of a distant marking line is increased and, at the same time, the load and time required for the arithmetic processing is reduced.

In the first aspect of the present invention, the marking line detection unit may include a detection condition calculation unit that calculates a detection condition for detecting the marking line. The road surface area identification unit may be configured to identify the immediately-preceding road surface area of the vehicle in the image information and an intermediate road surface area based on the depth distance information, the intermediate road surface area being present between the distant road surface area and the immediately-preceding road surface area in the image information. The detection condition calculation unit may be configured to calculate a first detection condition, a second detection condition, and a third detection condition. The first detection condition is a condition for detecting the marking line in the distant road surface area. The second detection condition is a condition for detecting a marking line in the immediately-preceding road surface area. The third detection condition is a condition for detecting a marking line in the intermediate road surface area based on the first and second detection conditions.

Furthermore, in the first aspect of the present invention, the detection condition calculation unit may be configured to calculate the first detection condition, the second detection condition, and the third detection condition based on an edge strength of each marking line in the immediately-preceding road surface area, the intermediate road surface area, and the distant road surface area.

In the first aspect of the present invention, the road surface area identification unit may be configured to identify a new distant road surface area that is nearer to the vehicle than the distant road surface area when the marking line is not detected in the distant road surface area.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a diagram showing a road surface estimation area;

DETAILED DESCRIPTION OF EMBODIMENTS

A marking line detection system and a marking line detection method in an embodiment of the present invention are described below in detail with reference to the drawings. It should be noted that the present invention is not limited to this embodiment.

Embodiment

An embodiment of the marking line detection system and the marking line detection method of the present invention are described with reference to FIG. 1 to FIG. 11.

Figure 1:
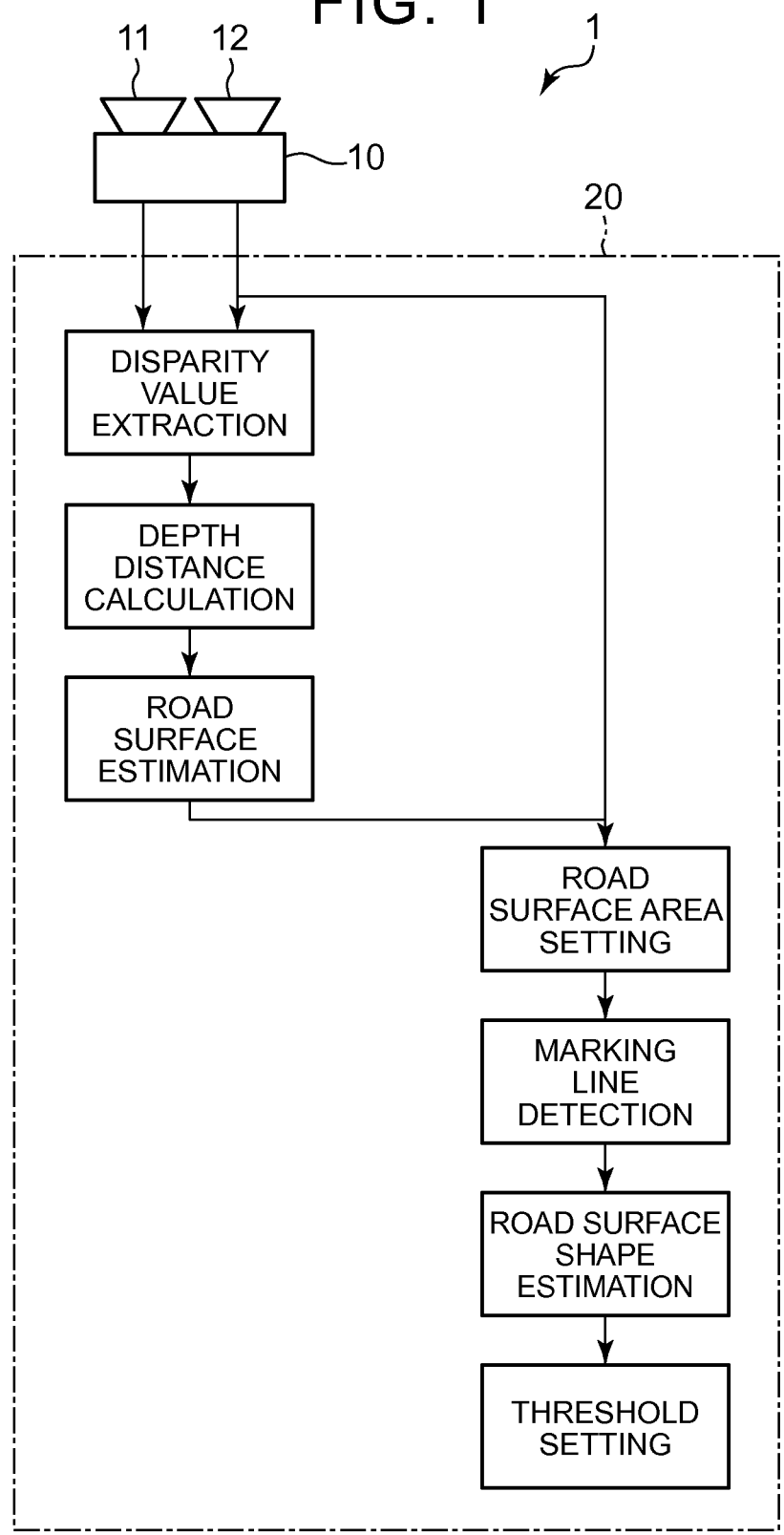
FIG. 1 is a diagram showing an example of a configuration of a marking line detection system in an embodiment of the present invention.

FIG. 1 is a diagram showing a marking line detection system 1 in this embodiment. This marking line detection system 1 detects a marking line based on the acquired surrounding information on the vehicle. A marking line in this embodiment refers to a lane boundary line, usually white or yellow in color, on the road surface around the vehicle.

The marking line detection system 1 includes a surrounding information acquisition unit that acquires the surrounding information on the vehicle, a road surface area identification unit that identifies a road surface area based on the acquired surrounding information, and a marking line detection unit that detects a marking line in the identified road surface area.

The surrounding information acquisition unit acquires the vehicle surrounding information in which the road surface, marking lines, solid objects (other vehicles, buildings, etc.), and background (sky, etc.) can be identified. In this embodiment, an imaging device 10 is used for this surrounding information acquisition unit. The imaging device 10 is configured to capture the surroundings of the vehicle and acquire the image information in the imaging area as the vehicle surrounding information. From this image information, the road surface and the marking line are identified, and the road surface, solid objects, and background are identified, as described below. The image information is a set of pixels each having brightness value information in the imaging area. Therefore, a brightness image, which represents the positions of an image in the imaging area (hereinafter called a "captured image") in terms of brightness, is acquired from this image information. The road surface and the marking line can be identified based on the brightness value information included in the image information in the imaging area (more specifically, the brightness value information, included in each pixel, that represents the brightness image of the imaging area). The road surface, solid objects, and background can be identified based on the depth distance information extracted from the image information. The depth distance information can be used also to identify the road surface and the marking line. To identify the road surface and the marking line based on the depth distance information, a method known in this technical field can be used.

The depth distance information refers to the information that represents the depth distance from the imaging device 10 to an imaging object in the captured image. The direction of the depth distance is defined as follows. When the horizontal direction (lateral direction) and the vertical direction (longitudinal direction) of a captured image are defined as the X-coordinate and the Y-coordinate respectively, the direction of the depth distance is the direction that is at right angles with the XY plane and is a moving direction from the imaging device 10 toward a distant position in the imaging direction of the imaging device 10. Therefore, the imaging device 10 captures an image at least in the traveling direction of the vehicle.

To identify various objects, the device used as the imaging device 10 is required to obtain image information, which includes brightness value information, and the depth distance information based on the obtained image information. In this embodiment, a stereo camera is used as the imaging device 10. The use of a stereo camera allows a left-side camera 11 and a right-side camera 12 to acquire the image information in the same imaging area. Therefore, as will be described later, the disparity value information in the imaging area can be obtained from the image information captured by the left-side camera 11 and the right-side camera 12. Based on the obtained disparity value information, the depth distance information can be calculated. Although a stereo camera is used as the surrounding information acquisition unit (imaging device 10) in this embodiment, a monocular camera may also be used as the surrounding information acquisition unit. In this case, the monocular camera must be able to acquire the image information, which includes the brightness value information, and the depth distance information that indicates the distance to an imaging object around the vehicle so that the road surface, marking line, solid objects, and background can be identified. If a monocular camera is used, the depth distance information is calculated by a method known in this technical field.

The marking line detection system 1 includes a marking line detection ECU 20. The marking line detection ECU 20 is an electronic control device including executable program logic that performs an arithmetic operation in the marking line detection system 1. The image information (image information from the left-side camera 11 and the image information from the right-side camera 12) on an imaging area captured by the imaging device 10 is sent to the marking line detection ECU 20. The marking line detection ECU 20 acquires the disparity value information in the imaging area based on the image information from each of the left-side camera 11 and the right-side camera 12 and, based on the acquired disparity value information, calculates the depth distance information. Based on the calculated depth distance information, the marking line detection ECU 20 identifies the road surface area, included in the captured image and distant from the vehicle, and detects the marking line in the road surface area based on the brightness value information in the identified distant road surface area. The road surface area identification unit and the marking line detection unit in this embodiment are provided as one of the arithmetic processing functions of the marking line detection ECU 20.

The marking line detection ECU 20 further includes an information extraction unit that extracts the disparity value information and the depth distance information from the image information captured by the imaging device 10. The marking line detection unit detects the marking line of an identified road surface area based on at least one of the image information, brightness value information, depth distance information, and disparity value information. The image information corresponds to the position of the identified road surface area (for example, distant road surface area that will be described later). The brightness value information is included in the image information. The depth distance information and the disparity value information correspond to the position of the identified road surface area. The marking line detection unit in this embodiment identifies the road surface and the marking line using the image information (image information from one of the left-side camera 11 and the right-side camera 12) in the imaging area. In this embodiment, the marking line detection unit identifies the road surface and the marking line using the brightness value information included in the image information. On the other hand, the road surface area identification unit identifies the road surface, solid objects, and background using the depth distance information (disparity value information) extracted based on the image information (image information from the left-side camera 11 and the right-side camera 12) in the imaging area.

The information extraction unit calculates the depth distance information (disparity value information) using a method known in this technical field. The information extraction unit calculates a disparity image in the imaging area based on the image information from each of the left-side camera 11 and the right-side camera 12. The disparity image represents a set of pixels, each of which has disparity value information, in the imaging area. The disparity image indicates the disparity at each coordinate in one of the image information from the left-side camera 11 and the image information from the right-side camera 12 (hereinafter called "base image information"). The information extraction unit can obtain the disparity value information in the imaging area based on the image information from each of the left-side camera 11 and the image information from the right-side camera 12. There is a unique correspondence between disparity values and depth distances. Therefore, the information extraction unit can obtain the depth distance information in the imaging area based on the disparity value information.

The road surface area identification unit in this embodiment identifies a part or the whole of the road surface area from the base image information based on the depth distance information (disparity value information) in the imaging area.

Figure 3:
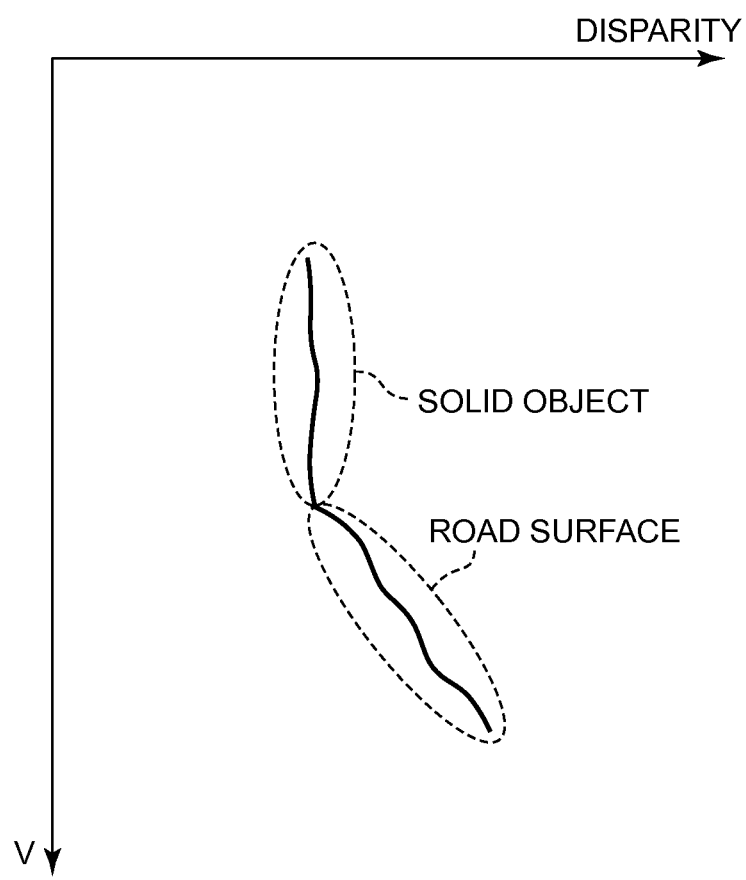
FIG. 3 is a diagram showing a V-disparity curve.

The road surface area identification unit divides the base image information into a plurality of pieces as shown at the top of FIG. 2. In addition, the road surface area identification unit generates the depth distance (disparity value) curve for the coordinate V (coordinate corresponding to the Y coordinate described above), such as the one shown in FIG. 3, based on the depth distance information (disparity value information) calculated by the information extraction unit. FIG. 3 is a diagram showing the V-disparity curve. The V-disparity curve refers to a curve in the two-dimensional plane in which the vertical direction (longitudinal direction)

coordinate V in the base image information is projected onto the vertical axis and the disparity value corresponding to the coordinate V is projected onto the horizontal axis. The road surface area identification unit estimates the road surface, solid objects, and background in the base image information based on the slope and the intercept of the V-disparity curve. In the part of the V-disparity curve corresponding to the solid objects and the background, the disparity value remains almost constant because the distance to the solid objects and the background in the image depth direction does not change. On the other hand, in the part of the V-disparity curve corresponding to the road surface, the disparity value changes because the distance to the road surface in the image depth direction changes. This allows the road surface area identification unit to identify the road surface, solid objects, and background based on the disparity value corresponding to the coordinate V determined by the V-disparity curve. Note that the base image information is divided in the almost vertical (almost longitudinal) direction. In the example shown at the top in FIG. 2, the base image information is divided in the longitudinal direction. The road surface area identification unit generates the V-disparity curve in the base image information by projecting the disparity value at each coordinate V onto the two-dimensional plane while performing scanning in the vertical direction (longitudinal direction) from the distant side to the vehicle side in each division area (divided partition). The road surface area identification unit sequentially projects the disparity values, one for each division area, from the leftmost division area to the rightmost division area or from the rightmost division area to the leftmost division area.

As described above, the road surface area identification unit first identifies the road surface, solid objects, and background in the base image information using the depth distance information (disparity value information). That is, the road surface area identification unit detects an area, which is estimated as the road surface in the base image information (hereinafter called also a "road surface estimation area"), based on the depth distance information (disparity value information) (see the figure at the bottom of FIG. 2). Therefore, the area for which the arithmetic processing is to be performed by the marking line detection ECU 20 in the post-process can be limited to the road surface estimation area and its surrounding areas in the base image information. This reduces the load and the time required for the arithmetic processing in the post-process. In the figure at the bottom of FIG. 2, the areas other than the road surface estimation area is indicated by hatching for the sake of description.

Next, the road surface area identification unit identifies a part of the image information (base image information) as an area in which the marking line is to be detected (hereinafter called a "marking line detection target area"). For example, the road surface area identification unit identifies a road surface area in the image information (base image information), which does not include the immediately-preceding road surface area of the vehicle and is more distant than the immediately-preceding road surface area (hereinafter, this road surface area in the image information is called a "distant road surface area"), as the marking line detection target area.

More specifically, the road surface area identification unit identifies the part of the road surface estimation area in the base image information, from which the immediately-preceding road surface estimation area in the traveling direction of the vehicle is excluded, as the distant road surface area. The immediately-preceding road surface area refers to a road surface area near the vehicle in which the marking line can be detected in a method known in the related art without having to know the road surface shape (curvature, etc.) of the traveling road of the vehicle. That is, the distant road surface area may be Considered a part of the road surface area in the traveling road that has been identified in the related art based on the estimation of the road surface shape of the vehicle's traveling road. The road surface area identification unit may also identify all of the road surface estimation area as the marking line detection target area.

For example, as the speed of the vehicle becomes higher, the road surface area identification unit may identify a part of the road surface estimation area in a position distant from the vehicle (upper part of base image information) as the distant road surface area that is the marking line detection target area. The part of the road estimation area in a position distant from the vehicle (that is, distance between the vehicle and the road surface in the image depth direction) is determined, in advance, according to the speed of the vehicle. Note that the distance between the vehicle and a position in the traveling road, which is thought of as the depth distance information described above, is calculated from the disparity value information.

The road surface area identification unit determines at least the road surface estimation area and its surrounding area in the base image information as the scan area and, based on the depth distance information (disparity value information) obtained when the scan area is scanned, identifies the marking line detection target area. The road surface area identification unit may set the division areas in the horizontal direction (lateral direction) for each coordinate V and, in each division area in the scan area, perform scanning in the horizontal direction (lateral direction) from the left end to the right end or from the right end to the left end. For example, the road surface area identification unit performs scanning sequentially for each division area in the horizontal direction (lateral direction) from the division area on the distant side to the division area on the vehicle side in the scan area or from the division area on the vehicle side to the division area on the distant side in the scan area.

Figure 4:
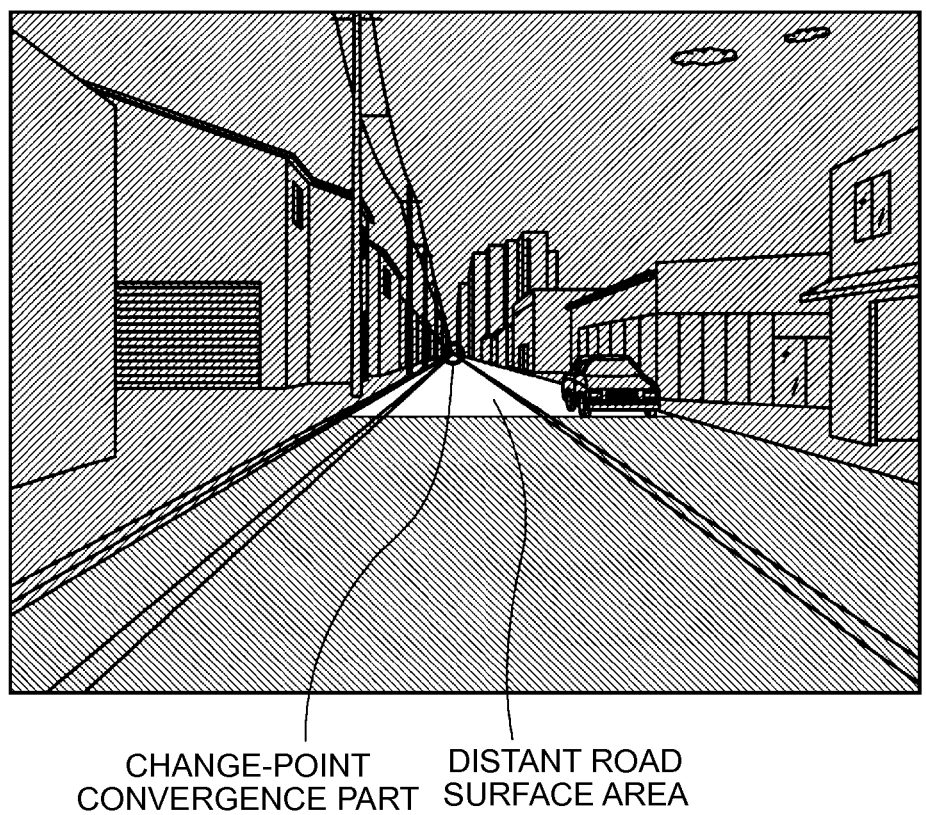
FIG. 4 is a diagram showing an identified distant road surface area.

For example, based on the depth distance information (disparity value information) obtained by the scan of the scan area (road surface estimation area and its surrounding area), the road surface area identification unit detects the position at which the change point in the base image information converges (hereinafter called a "change-point convergence part"). The change point refers to the position at which switching among the road surface, solid objects, and background occurs in the base image information. The road surface area identification unit identifies the part of the road surface estimation area below the change-point convergence part (that is, on the vehicle side) as the distant road surface area that is the marking line detection target area (FIG. 4). In FIG. 4, for the sake of description, hatching is indicated not only in the area other than the road surface estimation area that is shown in FIG. 2 but also in the area other than the distant road surface area in the road surface estimation area.

On the other hand, when the traveling road of the vehicle changes from a flat road or a downhill road to an uphill road or from a downhill road to a flat road, the road surface estimation area sometimes continues from the lower end or lower part of the base image information to the upper end. In this case, the change-point convergence part is not detected. Therefore, when the change-point convergence part is not detected during the scanning of the scan area (road surface estimation area and its surrounding area), the road surface area identification unit may extract the change point between the road surface, detected in the uppermost position in the base image information, and the solid objects and the background and, then, identify the road surface estimation area around this change point as the distant road surface area that is the marking line detection target area.

When the scan point reaches a position where the distance between the vehicle and the road surface reaches a predetermined value in the image depth direction while the road surface area identification unit scans the scan area (road surface estimation area and its surrounding area) in the vertical direction (longitudinal direction) as described above, the road surface area identification unit may identify the position as the distant road surface area that is the marking line detection target area. The predetermined value may be determined in advance according to the speed of the vehicle.

When identifying the marking line detection target area, the road surface area identification unit may perform scanning in the horizontal direction (lateral direction) with any position, such as the left end or right end or a position inside the base image information, as the start point. However, the position of the area that is considered the road surface in the base image information (road surface estimation area) is already determined in this embodiment based on the depth distance information (disparity value information) as described above. Therefore, the road surface area identification unit may identify the distant road surface area, which is the marking line detection target area, by performing scanning beginning at the position corresponding to the position of the road surface estimation area in the base image information as described in the above example.

For example, the lower end or the lower part of the base image information includes the road surface estimation area regardless of the shape of the traveling road of the vehicle. Therefore, the road surface area identification unit performs scanning the road surface estimation area and its surrounding area in the upward direction, beginning at the lower end or the lower part of the base image information. This scanning method eliminates the wasteful arithmetic processing for an area in which a marking line is not present, thus reducing the arithmetic processing load.

In some cases, the road surface area identification unit may be able to identify the distant road surface area more quickly by performing scanning from the upper end of the base image information into the downward direction than by performing scanning with the lower end as the starting point. Therefore, the road surface area identification unit may perform scanning with the upper end of the base image information as the starting point. In addition, when a left-turning road is detected as the traveling road of the vehicle based on the map information and the vehicle position information obtained from the car navigation system, there is the road surface estimation area on the left side in the base image information. Therefore, the road surface area identification unit may perform scanning from the left end of the base image information into the right direction. By determining the start point of scanning as described above, the road surface area identification unit can reduce the arithmetic processing load when identifying the marking line detection target area.

Incidentally, the road surface area identification unit may identify the road surface estimation area of a predetermined partition in the base image information as the distant road surface area that is the marking line detection target area. As the predetermined partition, one particular division area of the division areas, generated by horizontally dividing the base image information, is determined in advance so that it is selected from the division areas. For example, when the road surface is that of a straight, flat road, it is assumed that the road surface estimation area, which will be identified as the distant road surface area, is present in the central part of the base image information, though this assumption depends upon the conditions such as the angle of view of the imaging device 10 or the pitch variation in the vehicle. Therefore, when there is a road surface estimation area in the horizontal division area in which the central part is included, the road surface area identification unit may identify the road surface estimation area in that division area as the distant road surface area that is the marking line detection target area. On the other hand, when there is no road surface estimation area in that horizontal division area, the road surface area identification unit determines whether there is a road surface estimation area in another division area that is nearer to the vehicle side than that division area. When there is a road surface estimation area in that another division area, the road surface area identification unit identifies the road surface estimation area as the distant road surface area that is the marking line detection target area. When there is no road surface estimation area in that another division area, the road surface area identification unit performs the same arithmetic processing for a division area that is further nearer to the vehicle side.

In addition, the road surface area identification unit may identify not only such a distant road surface area but also the immediately-preceding road surface area described above as the marking line detection target area. In this case, the road surface area identification unit may apply the information on the already-detected road surface estimation area directly to the immediately-preceding road surface area. In addition, the road surface area identification unit may also perform scanning again for the road surface estimation area as described above and, then, identify the immediately-preceding road surface area.

In this embodiment, the road surface area identification unit is configured as described above because the road surface estimation area is divided roughly into the two: the distant area for the vehicle and the immediately-preceding area for the vehicle. However, when the road surface estimation area is further sub-divided into three or more areas, it is desirable that the road surface area identification unit be configured to identify any of these areas as the marking line detection target area.

The marking line detection unit in this embodiment determines whether there is a marking line in the marking line detection target area identified by the road surface area identification unit. The marking line detection unit detects a marking line in the detection target area based on the brightness value information on the detection target area. A marking line may be detected by a method known in this technical field.

The marking line detection unit can be subdivided into the following units: edge point detection unit, edge point pairing unit, edge segment detection unit, edge segment pairing unit, and marking line selection unit.

The edge point detection unit detects an edge point (a point where the brightness changes from dark to bright or from bright to dark) in the marking line detection target area. An edge point may be detected by a method known in this technical field.

Figure 5:
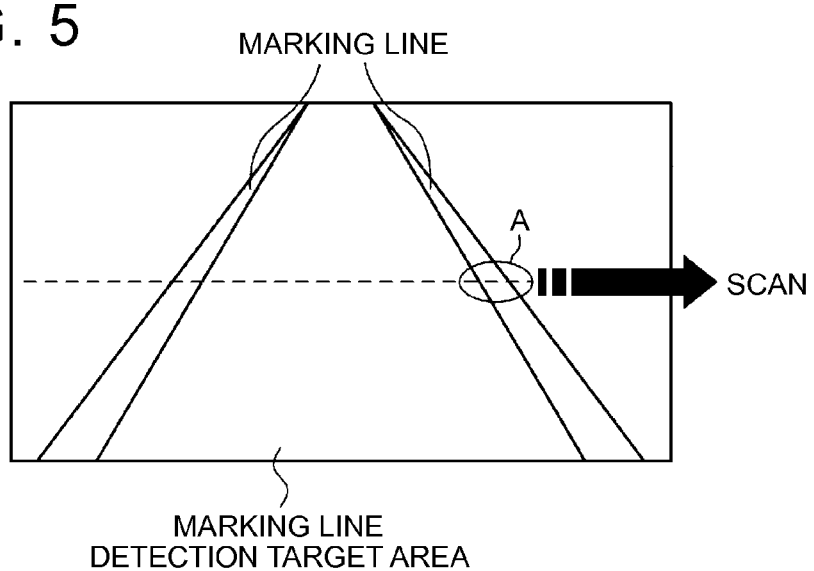
FIG. 5 is a diagram showing the detection processing of a marking line.
Figure 6:
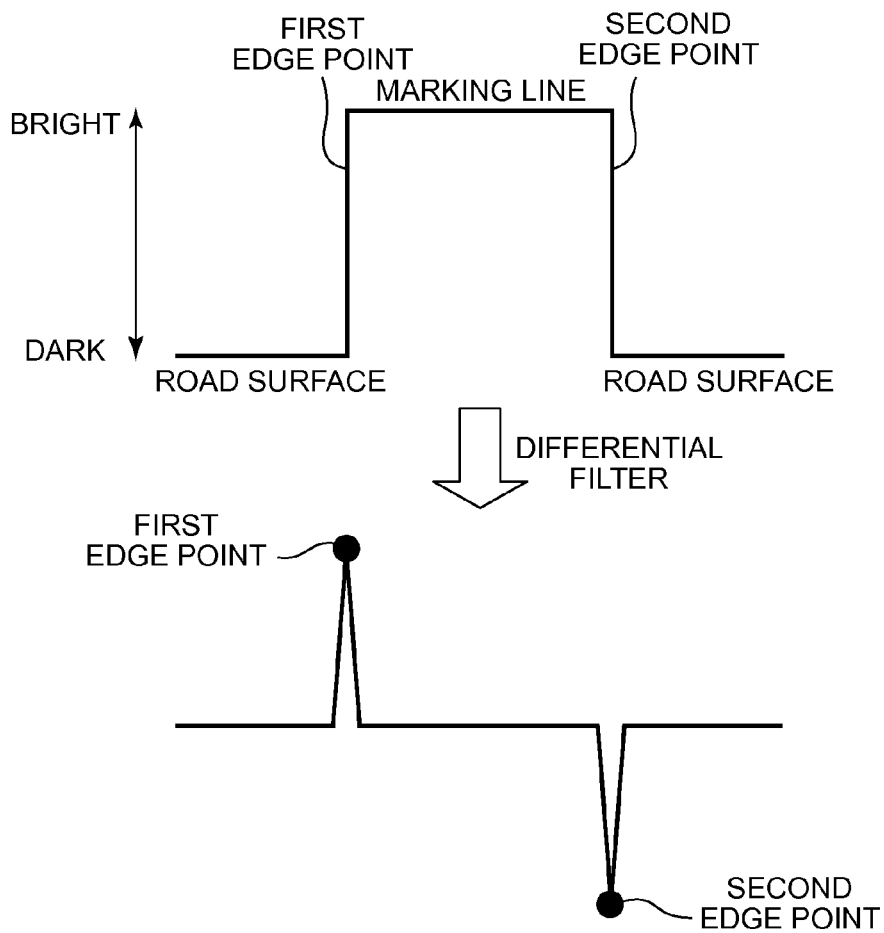
FIG. 6 is a diagram showing the detection processing of a marking line in part A in FIG. 5.

For example, the edge point detection unit scans at least the marking line detection target area in the base image information in the horizontal direction as shown in in the figures in FIG. 5 and at the top of FIG. 6. At this time, the edge point detection unit uses a differential filter (for example, a sobel filter) for the brightness value information at each position in the detection target area. By using this differential filter, the edge point detection unit calculates the edge strength of a first edge point (rising edge point), where the brightness changes from dark (mainly, black) to bright (mainly, white or yellow), and the edge strength of a second edge point (falling edge point) where the brightness changes from bright to dark (see the figure at the bottom of FIG. 6). That is, the edge point detection unit detects the first edge point and the second edge point, which are thought of as the edge points of a marking line, from the marking line detection target area in the base image information. The dark part corresponds mainly to the asphalt part. On the other hand, the bright part corresponds mainly to a marking line on the road surface.

Figure 7:
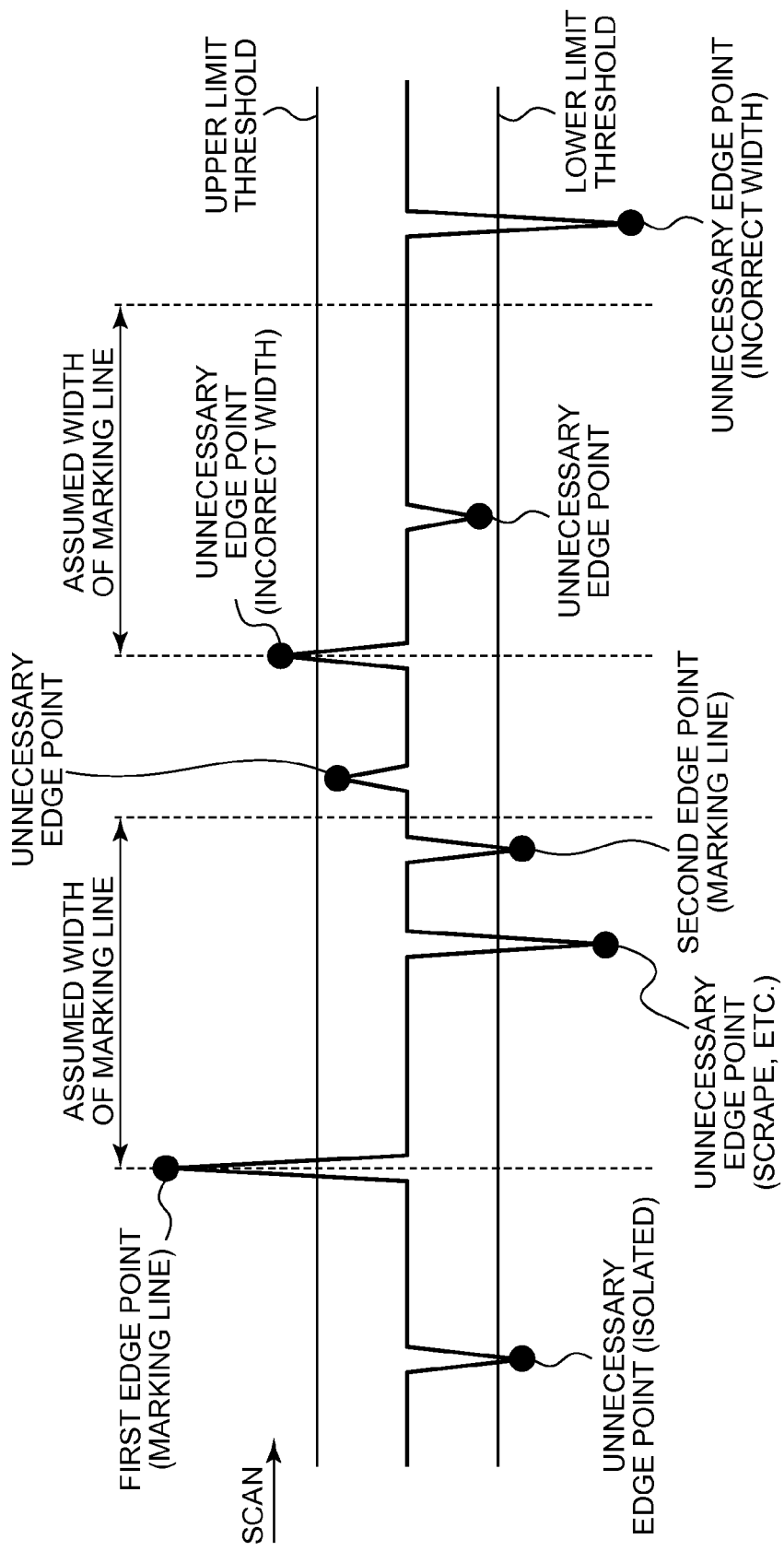
FIG. 7 is a diagram showing the detection processing of a marking line.

An edge point with low edge strength represents a position where the contrast between the preceding part and the following part is low. In this case, it is difficult to determine whether the edge point is detected due to a factor other than a marking line, such as a noise or a stain on the road surface, or due to a scrape in a part of a marking line. Therefore, when detecting a first edge point and a second edge point, the edge point detection unit compares the edge strength of a detected edge point with the threshold and, if it is difficult to determine whether the edge point is that of a marking line, excludes the edge point. In this example, if the edge strength is included in the threshold range between the upper limit threshold and the lower limit threshold, the edge point is excluded assuming that it is not necessary for the later arithmetic processing (FIG. 7). On the other hand, the marking line detection unit detects an edge point, the edge strength of which exceeds the upper limit threshold, as a first edge point, and detects an edge point, the edge strength of which is below the lower limit threshold, as the second edge point. When the threshold is applied to the image information in the first frame, a pre-set value is used; when the threshold is applied to the image information in the second and the following frames, a value calculated by the detection condition calculation unit, which will be described later, is used.

However, all detected first edge point and the second edge point do not necessarily represent the edge point of a marking line. There is a possibility that an edge point, where the contrast is high due to a noise or a stain on the road surface, is detected. To address this problem, the edge point pairing unit is provided in this embodiment.

Figure 8:
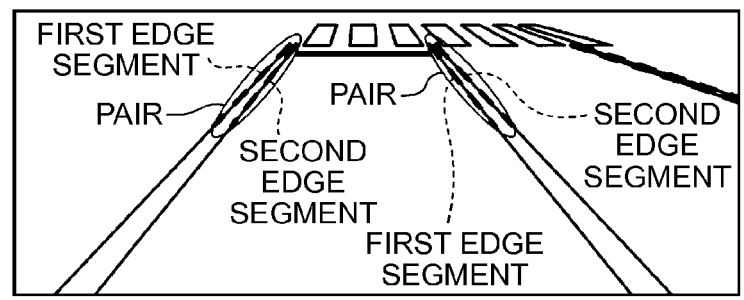
FIG. 8 is a diagram showing the detection processing of a marking line.
Figure 9:
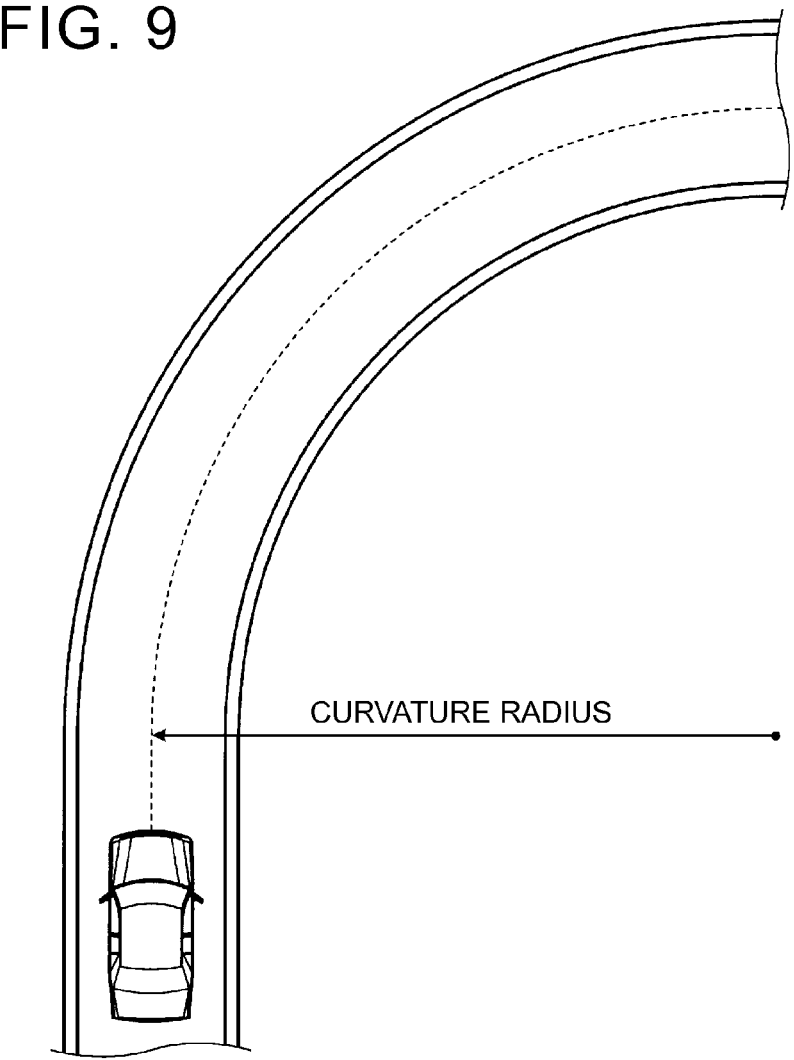
FIG. 9 is a diagram showing the estimation of a road surface shape.

The edge point pairing unit extracts a first edge point and a second edge point, which form a pair, from the detected first edge points and the second edge points and, after that, excludes a first edge point and a second edge point, which are not paired but isolated, as unnecessary edge points (FIG. 8). The pair is a set of a first edge point and a second edge point detected in one marking line. To determine whether the two edge points form a pair, the width between the first edge point and the second edge point and the brightness value information on the first edge point and the second edge point are used. For example, when pairing a first edge point and a second edge point, the edge point pairing unit forms a pair of a first edge point and a second edge point if the distance (width) between the two edge points is within a predetermined range with respect to the assumed width of a pre-set marking line. On the other hand, if the distance (width) is out of a predetermined range with respect to the assumed width, the edge point pairing unit excludes these edge points assuming that the first edge point and the second edge point are unnecessary edge points that are detected due to a noise.

A first edge point or a second edge point, which is present between the first edge point and the second edge point that are detected as a pair, is considered as a point detected due to a difference in contrast. This difference is generated, for example, due to a scrape in the marking line. These first edge point and second edge point are not necessary when detecting the first edge segment or the second edge segment described below. Therefore, it is desirable that these edge points be treated as unnecessary edge points.

All first edge points and second edge points, selected as described above, are more likely to be the edge points of a marking line. The edge segment detection unit performs the Hough transform processing for all first edge points and second edge points to detect segments (first edge segment and second edge segment) arranged in a straight form or a curved form (FIG. 8).

The edge segment pairing unit calculates the parallelism or the distance for all detected first edge segments and second edge segments and, using the calculated result, extracts a first edge segment and a second edge segment that form a pair (FIG. 8). The pair refers to a set of a first edge segment and a second edge segment detected from one marking line (each line when the line is a broken line).

Each of the first edge segment and the second edge segment of the pair represents the boundary of one marking line. The marking line selection unit selects the marking line of the traveling road of the vehicle based on the first edge segment and the second edge segment of the pair.

If the marking line information on the vehicle, detected in the past, is not available when selecting a marking line, the marking line selection unit selects an area, surrounded by the first edge segment and the second edge segment newly detected as a pair, as the marking line of the vehicle. If three or more marking lines are detected, the marking line selection unit selects the marking line of the vehicle by referring to the vehicle's position or other vehicle's position with respect to each detected line or by referring to the traveling directions of the other vehicles. If the marking line of the vehicle cannot yet be determined, the marking line selection unit identifies another area as the marking line detection target area and, with consideration also for the position of the marking line detected in the new detection target area, selects the marking line of the vehicle.

On the other hand, if the marking line information on the vehicle, detected in the past, is available, the marking line selection unit extracts a pair of a first edge segment and a second edge segment similar to the past marking line information and, then, selects an area, surrounded by the first edge segment and the second edge segment, as the marking line of the vehicle.

The marking line information on the vehicle, detected in the past, refers to the marking line information on the vehicle detected in a frame generated before the frame of the current base image information or to the marking line information on the vehicle detected when the vehicle traveled on the same road surface before.

The marking line detection unit detects the marking line of the vehicle as described above.

The marking line detection ECU 20 further includes a road surface shape estimation unit that estimates the road surface shape. Based on the marking line detected by the marking line detection unit (more strictly, the coordinates of the first and second edge segments in the marking line and their edge strengths), the road surface shape estimation unit estimates the road surface shape of the position where the marking line is present (for example, FIG. 9). For example, the road surface shape estimation unit uses the least-squares method or the Kalman filter to estimate the traveling road parameters (curvature, curvature change rate, yaw angle, lateral position) that represent the road surface shape of the vehicle's traveling road.

The marking line detection ECU 20 may include a projection control unit that projects the road surface shape and the marking line according to the traveling road parameters onto the base image information.

The marking line detection ECU 20 includes a detection condition calculation unit that calculates the marking line detection condition. The detection condition, a condition for detecting a marking line from the base image information, includes the differential filter for calculating the edge strength described above and the threshold for detecting an edge point. For example, after the marking line detection unit detects the marking line in the detection target area in the base image information used in the current arithmetic processing process (first frame) and the road surface shape estimation unit estimates the road surface shape of the vehicle's traveling road for the marking line, the detection condition calculation unit calculates the detection condition that will be used in the marking line detection target area in the base image information used in the next arithmetic processing process (next frame).

To calculate this detection condition, the detection condition calculation unit divides the base image information in the current arithmetic processing process into a plurality of pieces and calculates the marking line detection condition for each area (hereinafter called a "detection condition calculation area"). In this case, if only a part of the marking line is detected in the base image information in the current arithmetic processing process, the detection condition calculation unit calculates the detection condition only for the detection condition calculation area in which the marking line is included.

Figure 10:
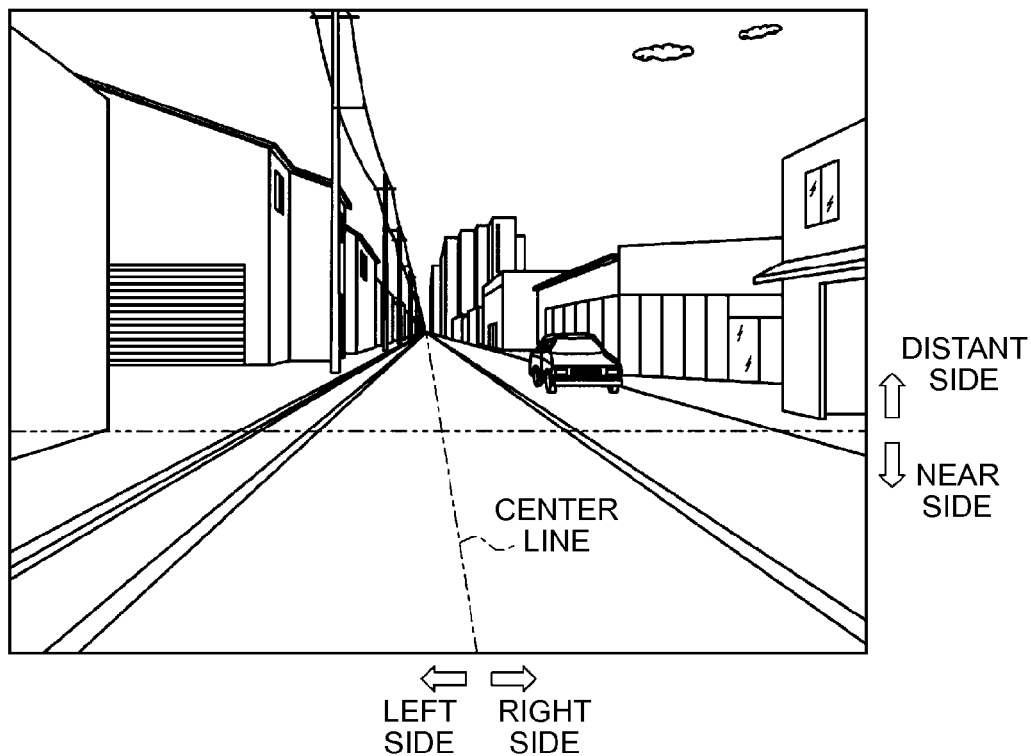
FIG. 10 is a diagram showing a detection condition calculation area.

In this embodiment, the base image information is divided into four detection condition calculation areas: distant side, near side, left side, and right side (see FIG. 10). The division between the distant side and the near side may be set based on the camera parameters determined by the angle of view of the imaging device 10. In addition, the division between the distant side and the near side may be changed as necessary by causing the detection condition calculation unit to correct the camera parameters considering the pitch variation in the vehicle. The division between the distant side and the near side may also be determined using the disparity value information and the depth distance information.

In addition, in this embodiment, the detection condition calculation unit calculates a virtual line (hereinafter called a "center line"), which is positioned in the middle of the traveling road parameters projected onto the two marking lines in the vehicle's lane and, with this center line as the boundary, divides the base image information into the left side and the right side. For example, the detection condition calculation unit calculates the average of the X coordinates of the traveling road parameters of the two marking lines to find the center line. In this example, the horizontal direction (lateral direction) of the base image information is the X coordinate, and the vertical direction (longitudinal) direction is the Y coordinate. When the base image information is divided into the detection condition calculation areas based on this center line, only the road surface estimation area is divided. If the traveling road parameters are not available (for example, in the first frame), the line that divides the base image information equally into two (left side and right side) may be used as the center line when setting the detection condition calculation areas.

More specifically, using the coordinates, edge strengths, and traveling road parameters of the first and second edge points of the marking line used in the current arithmetic processing process, the detection condition calculation unit calculates the upper limit threshold and the lower limit threshold, which will be used in the next arithmetic processing process, for the same detection condition calculation area as that of the current process. That is, the detection condition includes the upper limit threshold and the lower limit threshold. The current arithmetic processing process refers to the arithmetic processing process for the current frame as described above. Similarly, the next arithmetic processing process refers to the arithmetic processing process for the next frame.

The detection condition calculation unit calculates the average and the standard deviation of the edge strengths of the first and second edge points of the marking line in the detection condition calculation area for which the calculation is to be performed. After that, the detection condition calculation unit substitutes the calculated average and standard deviation in expression 1 and expression 2 given below to calculate the upper limit threshold and the lower limit threshold. "α" in each expression is an arbitrary pre-set value.

$$\text{Upper limit threshold} = \text{Average} + \alpha * \text{Standard deviation} \quad (1)$$

$$\text{Lower limit threshold} = \text{Average} - \alpha * \text{Standard deviation} \quad (2)$$

The detection condition calculation unit sets the upper limit threshold and the lower limit threshold, calculated as described above, as the upper limit threshold and the lower limit threshold for the next arithmetic processing process in the same detection condition calculation area as that of the current arithmetic processing process.

The detection condition calculation unit may set only the average of the edge strengths as the threshold. In this case, it is determined that an edge point with edge strength larger than the threshold is likely to be an edge point of the marking line.

In addition, the detection condition calculation unit sets the differential filter, which is used in the current arithmetic processing process, as the differential filter to be used in the next arithmetic processing process for the same detection condition calculation area as that of the current arithmetic processing process.

Figure 11:
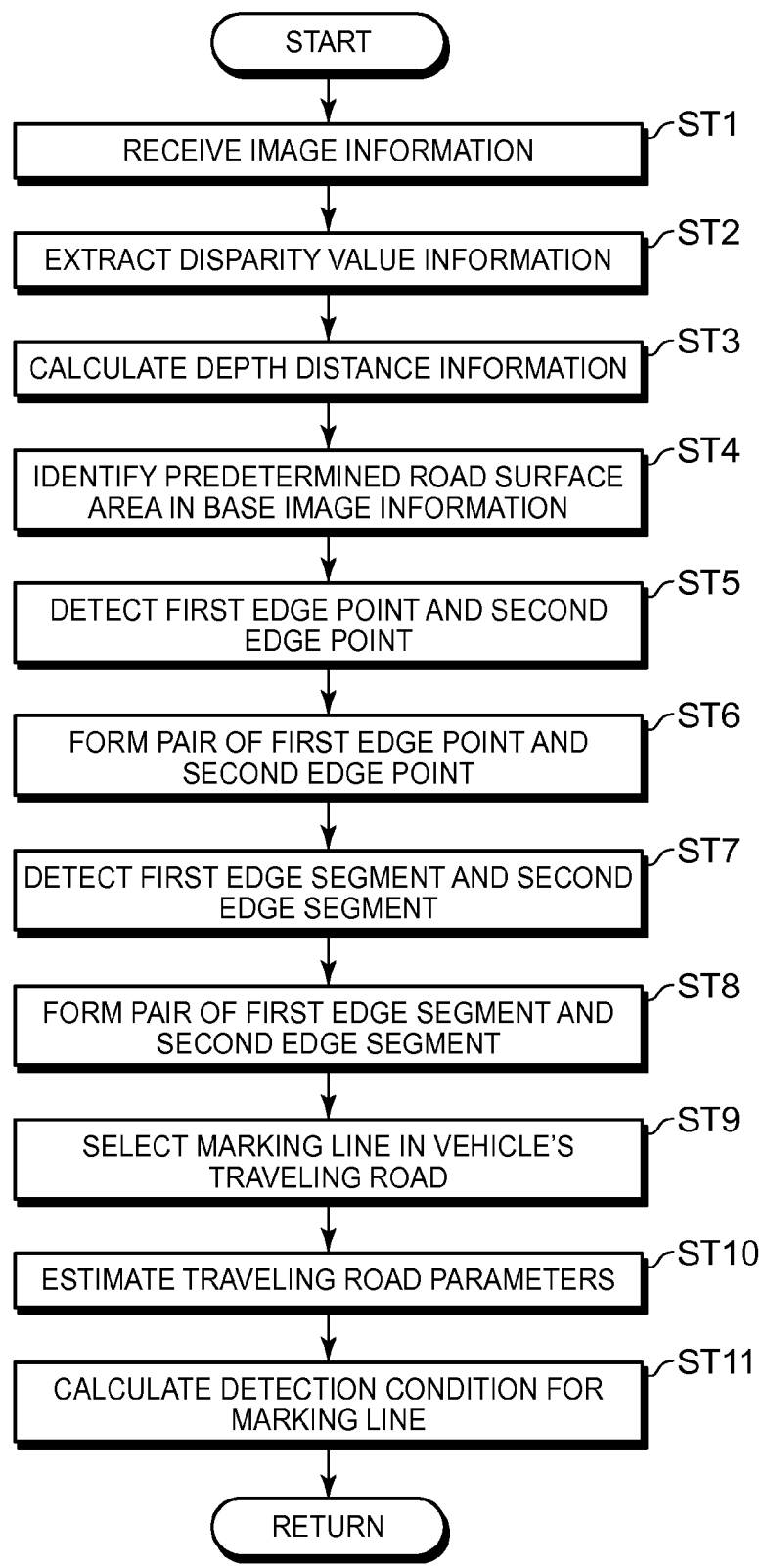
FIG. 11 is a flowchart showing an example of the arithmetic processing operation of the marking line detection system of the present invention.

The following describes an example of the arithmetic processing of the marking line detection ECU 20 with reference to the flowchart in FIG. 11. The flow chart represented in FIG. 11 represents an executable program logic for the ECU 20 to perform the functions.

The marking line detection ECU 20 receives image information on the imaging area captured by the imaging device 10 (step ST1).

The information extraction unit extracts disparity value information from the image information (step ST2). The disparity value information is extracted as described above. After that, the information extraction unit calculates the depth distance information based on the disparity value information (step ST3).

The road surface area identification unit identifies a predetermined road surface area in the base image information based on the depth distance information (step ST4). In this step, the distant road surface area in the base image information is identified as the marking line detection target area.

The edge point detection unit detects a first edge point and a second edge point in the predetermined road surface area (marking line detection target area) in the base image information (step ST5). In this step, the first edge point and the second edge point, which are considered as the edge points of a marking line, are detected from the predetermined road surface area (marking line detection target area) using the differential filter, upper limit threshold, and lower limit threshold.

The edge point pairing unit extracts a first edge point and a second edge point, which forms a pair, from the detected first edge points and second edge points. By doing so, the edge point pairing unit forms a pair of the first edge point and the second edge point (step ST6) and, after that, removes the unnecessary edge points that are caused by a noise or a stain.

The edge segment detection unit detects a first edge segment and a second edge segment based on all first edge points and second edge points that are not removed as unnecessary edge points (step ST7). After that, the edge segment pairing unit extracts a first edge segment and a second edge segment, which forms a pair, from all detected first edge segments and second edge segments and forms a pair of the first edge segment and the second edge segment (step ST8).

The marking line selection unit selects the marking line in the vehicle's traveling road based on the first edge segment and the second edge segment of the pair (step ST9). After that, the road surface shape estimation unit estimates the traveling road parameters of the vehicle's traveling road in the predetermined road surface area (marking line detection target area) based on the marking line (step ST10).

The detection condition calculation unit calculates the marking line detection condition to be used in the next arithmetic processing process (step ST11). For example, the detection condition calculation unit calculates the differential filter, tipper limit threshold, and lower limit threshold to be used next in the processing in step ST5.

After completing the arithmetic processing described above, the marking line detection ECU 20 repeats the arithmetic processing similarly for the image information in the next frame that will be received.

As described above, the marking line detection system and the marking line detection method in this embodiment obtain the road surface estimation area in the base image information using the depth distance information (disparity value information) based on the captured image information and, for the obtained road surface estimation area, performs arithmetic processing for detecting a marking line. Therefore, the marking line detection system and the marking line detection method can reduce the load and time required for the arithmetic processing for detecting a marking line. In addition, the marking line detection system and the marking line detection method perform arithmetic processing, not for the area where there is a solid object and the background, but for the road surface estimation area where there is likely a marking line. This increases the marking line detection accuracy and the detection success rate. In addition, the marking line detection system and the marking line detection method identify a predetermined road surface area (distant road surface area) from the road surface estimation area as the marking line detection target area and perform marking line detection processing for this detection target area. This allows the marking line detection system and the marking line detection method to further reduce the load and time required for the arithmetic processing for detecting the marking line.

The marking line detection system and the marking line detection method can detect the vehicle's marking line in the distant road surface area without having to sequentially detect the marking line, and without having to estimate the road surface shape of the traveling road, from the immediately-preceding road surface area of the vehicle to the distant road surface area as in the system in the related art. Therefore, the marking line detection system and the marking line detection method can avoid a situation in which the vehicle's marking line in a position distant from the vehicle cannot be detected, for example, when the road surface shape cannot be estimated successfully during traveling. This allows the marking line detection system and the marking line detection method to increase the detection accuracy of a distant marking line. In the related art, when the road surface shape cannot be estimated successfully, the marking line detection processing is performed for an incorrect area. In contrast, because the arithmetic processing performed due to such an incorrect recognition is reduced, the marking line detection system and the marking line detection method in this embodiment increase the detection accuracy of a distant marking line and, at the same time, reduce the load and time required for the arithmetic processing.

The marking line detection system and the marking line detection method can estimate the marking line and the road surface shape from the immediately-preceding road surface area to the distant road surface area by simply performing the marking line detection processing for a predetermined road surface area (distant road surface area) if the road surface shape of the vehicle's traveling road is straight.

The marking line detection system and the marking line detection method perform the marking line detection processing for the distant road surface area as described in this embodiment and, at the same time, perform the marking line detection processing for the immediately-preceding road surface area using the method described in this embodiment or the method in the related art. In performing the processing, the arithmetic processing for the distant road surface area and the arithmetic processing for the immediately-preceding road surface area can be performed separately. That is, the marking line detection system and the marking line detection method can detect the marking line in the immediately-preceding road surface area using the method in this embodiment or in the related art and, at the same time or before that processing, can detect the marking line in the distant road surface area using the method in this embodiment. Therefore, when traveling at a high speed, the marking line detection system and the marking line detection method allow the user to find the distant marking line or the road surface shape earlier, thus increasing the reliability of control continuity or vehicle's behavior during the lane departure prevention support control or the lane keeping support control. In addition, the marking line detection system and the marking line detection method, in which the arithmetic processing on one of the near side and the distant side of the vehicle is not affected by the arithmetic processing on the other side, prevent the arithmetic processing load and the time on each side from being increased.

As disclosed in Japanese Patent Application Publication No. 2010-060371 (JP 2010-060371 A), a technology is known that sets a vanishing point or a fixed point in the distant area in the image information and, with this vanishing point as the start point, detects a marking line (white line). In this case, however, the vanishing point is determined in advance by the focus of the lens and the imaging surface of the imaging device. This means that the vanishing point is not always set in the road surface area but is set sometimes in an area in which a solid object or the background is present. Therefore, the technology in the related art sometimes cannot achieve the above-described effect that can be achieved by the marking line detection system and the marking line detection method in this embodiment.

In the description of this embodiment, it is assumed that a marking line is always present in the marking line detection target area or that a marking line is always detected from the detection target area. However, a marking line is not always present on all road surfaces. In addition, even if present in the detection target area, a marking line may be hidden by other vehicles. For this reason, if a marking line is not detected in the marking line detection target area, the road surface area identification unit sets a new marking line detection target area in an area that is nearer to the vehicle than the detection target area. In this case, the road surface area identification unit may set a part or the whole of the area, which is the next area of the detection target area in which marking line is not detected and which is nearer to the vehicle (on the vehicle side), as the new marking line detection target area. If a marking line is not detected in the detection target area, this method allows the marking line detection system and the marking line detection method to repeatedly set a new marking line detection target area until finally a marking line is detected. In addition, if the initially-set marking line detection target area is an area in which a marking line should not be present, this method allows the marking line detection system and the marking line detection method to set a new marking line detection target area again, making it possible to correct a detection target area setting error.

Modification

A marking line detection system and a marking line detection method in this modification are similar to the marking line detection system and the marking line detection method in the embodiment except for the following points.

Figure 12:
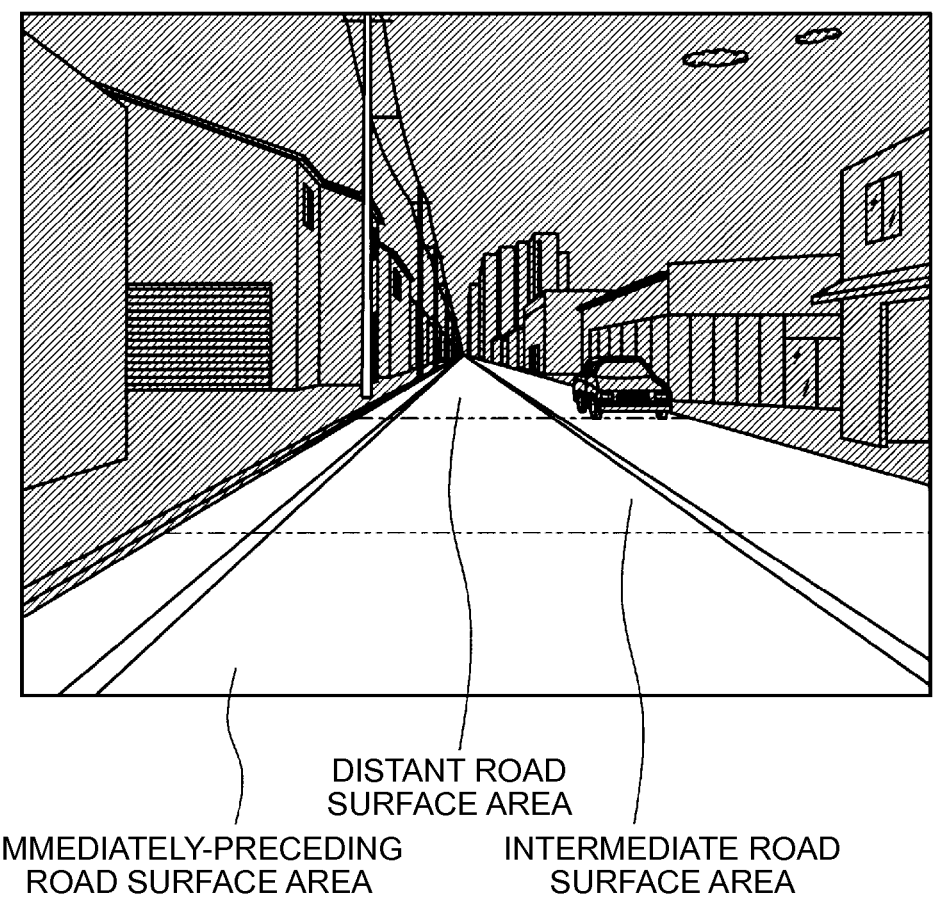
FIG. 12 is a diagram showing the road surface area when a detection condition is estimated.

As shown in FIG. 12, based on the depth distance information (disparity value information), the road surface area identification unit in this modification identifies not only the distant road surface area but also the immediately-preceding road surface area of the vehicle in the base image information and, at the same time, identifies an intermediate road surface area that is present between the distant road surface area and the immediately-preceding road surface area in the base image information. This road surface area identification unit identifies the distant road surface area as the marking line detection target area in the same way as the road surface area identification unit in the embodiment. In addition, this road surface area identification unit identifies the immediately-preceding road surface area and the intermediate road surface area as the marking line detection target area. The immediately-preceding road surface area and the intermediate road surface area are identified from the road surface estimation area described in the embodiment. The marking line detection unit in this modification can perform the marking line detection processing also for the immediately-preceding road surface area and the intermediate road surface area in the same way as the marking line detection unit in the embodiment.

After the detection of the marking line and the estimation of the road surface shape of the immediately-preceding road surface area are completed as in the distant road surface area, the marking line detection unit in this modification calculates the detection condition to be used for the next marking line detection processing process in this road surface area. The detection condition for the distant road surface area is referred to as a first detection condition, and the detection condition for the immediately-preceding road surface area is referred to as a second detection condition. The detection condition calculation unit calculates a third detection condition for detecting the marking line in the intermediate road surface area based on the first and second detection conditions.

In some cases, depending upon the time zone or the weather, there is a difference in the brightness value and the edge strength between a marking line captured in a distant area and a marking line captured in a near area.

For example, in the daytime, as the road surface area is more distant, the brightness value and the edge strength of the road surface area sometimes become lower than those of the immediately-preceding road surface area or the intermediate road surface area. Therefore, the above-described upper limit threshold and the lower limit threshold of the intermediate road surface area are smaller than those of the immediately-preceding road surface area, and the upper limit threshold and the lower limit threshold of the distant area road surface area are smaller than those of the intermediate road surface area. Therefore, the detection condition calculation unit in this modification can estimate the third detection condition, which is an interpolation value between the first detection condition and the second detection condition, by obtaining the first detection condition and the second detection condition. For example, as the third detection condition, the average of the value of the first detection condition and the value of the second detection condition may be used.

In the nighttime or on a cloudy day, the brightness value of an area near to the vehicle is smaller than the brightness value of a distant area (smaller edge strength) or the brightness value of an area distant from the vehicle is smaller than the brightness of a near area (smaller edge strength), depending upon the optical axis of the vehicle's headlight and the angle-of-view of the imaging device 10 or depending upon whether the headlight is on high beam or low beam. On a rainy day, the brightness value (edge strength) of a distant area or a near area sometimes depends on the amount of rainfall. Therefore, the detection condition calculation unit may estimate the third detection condition from the first detection condition and the second detection condition according to these various conditions.

The detection condition calculation unit may set a correction value for each of the above conditions in advance for estimating the third detection condition based on the correction value for the corresponding condition, first detection condition, and second detection condition.

In the description of this modification, the marking line detection target area is divided into three road surface areas according to the distance from the vehicle. Furthermore, the marking line detection target area may be divided into four or more road surface areas according to the distance from the vehicle. In this case, based on the detection condition of each of the two road surface areas, the detection condition calculation unit may calculate the detection condition for the road surface area that is present between the two road surface areas.

As described above, the marking line detection system and the marking line detection method in this modification calculate the detection condition for the intermediate road surface area, which is present between the two road surface areas, based on the detection condition of each of the two road surface areas that are the marking line detection target area. Therefore, the marking line detection system and the marking line detection method can estimate the detection condition to be used for this intermediate road surface area in advance without having to wait for the termination of the marking line detection or the road surface shape estimation in the intermediate road surface area, thus increasing the marking line detection accuracy and the detection success rate.

What is claimed is:

1. A marking line detection system comprising: an imaging device configured to capture surroundings of a vehicle; an electronic control unit configured to: extract depth distance information from the imaging device to an imaging object based on image information in an imaging area captured by the imaging device; identify a distant road surface area based on the depth distance information and based on a speed of the vehicle, the distant road surface area being a road surface area that excludes an immediately-preceding road surface area of the vehicle in the image information and is more distant from the vehicle than the immediately-preceding road surface area and, detect a marking line in the distant road surface area based on image information corresponding to a position of the distant road surface area.

2. The marking line detection system according to claim 1 wherein the electronic control unit is further configured to: calculate a detection condition for detecting the marking line and identify the immediately-preceding road surface area of the vehicle in the image information and an intermediate road surface area based on the depth distance information, the intermediate road surface area being present between the distant road surface area and the immediately-preceding road surface area in the image information, and calculate a first detection condition, a second detection condition, and a third detection condition, the first detection condition being a condition for detecting the marking line in the distant road surface area, the second detection condition being a condition for detecting a marking line in the immediately-preceding road surface area, and the third detection condition being a condition for detecting a marking line in the intermediate road surface area based on the first and second detection conditions.

3. The marking line detection system according to claim 2 wherein
the electronic control unit is further configured to calculate the first detection condition, the second detection condition, and the third detection condition based on an edge strength of each marking line in the immediately-preceding road surface area, the intermediate road surface area, and the distant road surface area.

4. The marking line detection system according to claim 1 wherein
the electronic control unit is further configured to identify a new distant road surface area that is nearer to the vehicle than the distant road surface area when the marking line is not detected in the distant road surface area.

5. A marking line detection method comprising:
extracting depth distance information from an imaging device to an imaging object based on image information in an imaging area captured by the imaging device that captures surroundings of a vehicle;
identifying a distant road surface area based on the depth distance information and a speed of the vehicle, the distant road surface area being a road surface area that excludes an immediately-preceding road surface area of the vehicle in the image information and is more distant from the vehicle than the immediately-preceding road surface area; and
detecting a marking line in the distant road surface area based on image information corresponding to a position of the distant road surface area.

* * * * *